US006649679B1

(12) United States Patent
Stockl et al.

(10) Patent No.: US 6,649,679 B1
(45) Date of Patent: Nov. 18, 2003

(54) STABLE WATERBORNE POLYMER COMPOSITIONS CONTAINING POLY(ALKYLENIMINES)

(75) Inventors: Rebecca Reid Stockl, Kingsport, TN (US); Peter Webb Raynolds, Kingsport, TN (US); Duane Allan Scott, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/467,071

(22) Filed: Dec. 20, 1999

Related U.S. Application Data

(63) Continuation-in-part of application No. 09/022,802, filed on Feb. 13, 1998, now Pat. No. 6,005,035.
(60) Provisional application No. 60/059,506, filed on Sep. 18, 1997.

(51) Int. Cl.$^7$ ................................................. C08K 3/20
(52) U.S. Cl. ....................................................... 524/253
(58) Field of Search ......................................... 524/253

(56) References Cited

U.S. PATENT DOCUMENTS

| | | | |
|---|---|---|---|
| 3,113,038 A | 12/1963 | Lattarulo et al. ............ 117/140 |
| 3,261,796 A | 7/1966 | Simms | |
| 3,261,797 A | 7/1966 | McDowell et al. ......... 260/29.6 |
| 3,290,417 A | 12/1966 | Christenson et al. ........ 260/901 |
| 3,325,443 A | 6/1967 | Christenson et al. ......... 260/41 |
| 3,356,627 A | 12/1967 | Scott ......................... 260/29.6 |
| 3,386,939 A | 6/1968 | Mesee et al. ............... 260/29.3 |
| 3,483,149 A | 12/1969 | Gresenz et al. ............... 260/18 |
| 3,553,116 A | 1/1971 | Kaplan et al. ................ 260/17 |
| 3,607,834 A | 9/1971 | Marx et al. ............... 260/63 R |
| 3,639,327 A | 2/1972 | Drelich ................ 260/29.6 NR |
| 3,678,013 A | 7/1972 | Sherwood et al. ..... 260/77.5 R |
| 3,679,564 A | 7/1972 | Dowbenko et al. .......... 204/181 |
| 3,725,124 A | 4/1973 | Gorton et al. ..... 117/138.8 UA |
| 3,876,596 A | 4/1975 | Grubert et al. | |
| 3,927,206 A | 12/1975 | Blank et al. .................. 424/81 |
| 4,032,482 A | 6/1977 | Moriya .......................... 260/2 |
| 4,136,067 A | 1/1979 | Reed et al. .................... 521/32 |
| 4,158,725 A | 6/1979 | Nishimura et al. ......... 526/52.1 |
| 4,210,565 A | 7/1980 | Emmons et al. ....... 260/29.6 TA |
| 4,239,893 A | 12/1980 | Pigerol et al. .............. 546/321 |
| 4,241,682 A | 12/1980 | Konstandt ................. 114/67 R |
| 4,244,850 A | 1/1981 | Mylonakis ............ 260/29.6 M |
| 4,535,128 A | 8/1985 | Umemoto et al. .......... 525/162 |
| 4,540,739 A | 9/1985 | Midgley ...................... 524/764 |
| 4,634,544 A | 1/1987 | Weber ......................... 252/95 |
| 4,678,606 A | 7/1987 | Akhter ....................... 252/162 |
| 4,759,983 A | 7/1988 | Knutson et al. ............. 428/343 |
| 4,812,541 A | 3/1989 | Mallya et al. ............... 526/264 |
| 4,820,863 A | 4/1989 | Taylor ........................ 560/115 |
| 4,839,413 A | 6/1989 | Kiehlbauch et al. | |
| 4,855,349 A | 8/1989 | Ingle .......................... 524/432 |
| 4,906,684 A | 3/1990 | Say ............................. 524/548 |
| 4,908,229 A | 3/1990 | Kissel ......................... 427/54.1 |
| 4,908,403 A | 3/1990 | Spada et al. ................. 524/818 |
| 4,927,876 A | 5/1990 | Coogan et al. | |
| 4,939,233 A | 7/1990 | Jenkins et al. | |
| 4,946,932 A | 8/1990 | Jenkins | |
| 4,980,404 A | 12/1990 | Aydin et al. ................. 524/100 |
| 4,987,186 A | 1/1991 | Akiyama et al. ............ 525/107 |
| 4,988,762 A | 1/1991 | Overbeek et al. ........... 524/839 |
| 5,002,680 A | 3/1991 | Schmidt ....................... 252/90 |
| 5,002,998 A | 3/1991 | Carey et al. ................ 524/555 |
| 5,021,469 A | 6/1991 | Langerbeins et al. ....... 523/201 |
| 5,049,416 A | 9/1991 | Wilczynski .............. 427/208.4 |
| 5,053,441 A | 10/1991 | Biale .......................... 523/201 |
| 5,053,452 A | 10/1991 | Spada et al. ................. 524/707 |
| 5,055,506 A | 10/1991 | Knutson ..................... 524/100 |
| 5,073,445 A | 12/1991 | Ingle ........................ 428/314.4 |
| 5,100,969 A | 3/1992 | Yamamoto et al. ....... 525/327.3 |
| 5,108,575 A | 4/1992 | Chung et al. ............ 204/181.7 |
| 5,122,567 A | 6/1992 | Spada et al. ................. 524/818 |
| 5,137,961 A | 8/1992 | Goos et al. | |
| 5,164,444 A | 11/1992 | Bernard ...................... 524/833 |
| 5,183,459 A | 2/1993 | Bernard ....................... 602/52 |
| 5,185,212 A | 2/1993 | Spada et al. ................. 428/483 |
| 5,185,397 A | 2/1993 | Biale .......................... 524/820 |
| 5,189,126 A | 2/1993 | Bernard ...................... 526/261 |
| 5,202,375 A | 4/1993 | Biale .......................... 524/562 |
| 5,227,413 A | 7/1993 | Mitra .......................... 523/116 |
| 5,242,978 A | 9/1993 | Muller et al. ............... 525/102 |
| 5,244,963 A | 9/1993 | Biale .......................... 524/555 |
| 5,246,984 A | 9/1993 | Darwen et al. ............. 523/404 |
| 5,247,040 A | 9/1993 | Amick et al. ............... 526/286 |
| 5,264,467 A | 11/1993 | DiStefano .................. 523/218 |
| 5,264,532 A | 11/1993 | Bernard ...................... 526/261 |

(List continued on next page.)

FOREIGN PATENT DOCUMENTS

| | | |
|---|---|---|
| DE | 2535372 | 2/1977 |
| DE | 3713511 | 12/1987 |
| EP | 0 271 033 | 6/1988 |

(List continued on next page.)

OTHER PUBLICATIONS

Smith et al., "New Vinyl Ester Monomers for Emulsion Polymers," Progress in Organic Coatings 22, 1993, pp. 19–25.

(List continued on next page.)

Primary Examiner—Edward J. Cain
(74) Attorney, Agent, or Firm—Bernard Graves; Michael K. Carrier

(57) ABSTRACT

This invention provides stable waterborne polymer compositions, which are stabilized against gelling, comprising a stable waterborne polymer composition having a Tg of greater than about 0° C. and comprising an acetoacetoxy-type functional polymer, a poly(alkylenimine), and a non-ionic surfactant having a hydrophilic-lipophilic balance (HLB) of at least about 17.5. The waterborne polymer compositions of the invention are particularly useful in a variety of adhesive formulations such as pressure sensitive adhesives, laminating adhesives, and the like. Methods of making stable waterborne polymer compositions are also disclosed.

19 Claims, No Drawings

U.S. PATENT DOCUMENTS

| | | | |
|---|---|---|---|
| 5,270,380 A | 12/1993 | Adamson et al. | 524/556 |
| 5,277,978 A | 1/1994 | Feustel et al. | 428/402 |
| 5,278,227 A | 1/1994 | Bernard | 524/817 |
| 5,296,159 A | 3/1994 | Wilson et al. | 252/117 |
| 5,296,530 A | 3/1994 | Bors et al. | 524/558 |
| 5,308,890 A | 5/1994 | Snyder | 523/201 |
| 5,344,675 A | 9/1994 | Snyder | 427/388.4 |
| 5,349,026 A | 9/1994 | Emmons et al. | 525/328.6 |
| 5,362,816 A | 11/1994 | Snyder et al. | 525/329.9 |
| 5,364,891 A | 11/1994 | Pears et al. | 522/149 |
| 5,371,148 A | 12/1994 | Taylor et al. | 525/293 |
| 5,391,624 A | 2/1995 | Rasoul et al. | 525/216 |
| 5,414,041 A | 5/1995 | Larson et al. | 524/589 |
| 5,426,129 A | 6/1995 | Emmons et al. | 522/6 |
| 5,435,879 A | 7/1995 | Knutson et al. | 156/327 |
| 5,484,849 A | 1/1996 | Bors et al. | 525/167.5 |
| 5,484,975 A | 1/1996 | Itatsu | |
| 5,494,961 A | 2/1996 | Lavoie et al. | 525/102 |
| 5,494,975 A | 2/1996 | Lavoie et al. | 525/928.6 |
| 5,498,659 A | 3/1996 | Esser | 524/549 |
| 5,525,662 A | 6/1996 | Lavoie et al. | 524/558 |
| 5,534,310 A | 7/1996 | Rokowski et al. | 427/494 |
| 5,539,073 A | 7/1996 | Taylor et al. | 524/553 |
| 5,541,251 A | 7/1996 | Bontinck et al. | 524/507 |
| 5,548,024 A | 8/1996 | Lavoie et al. | 525/102 |
| 5,559,192 A | 9/1996 | Bors et al. | 525/300 |
| 5,562,953 A | 10/1996 | Bors et al. | 427/558 |
| 5,605,722 A | 2/1997 | Esser | 427/388.4 |
| 5,605,952 A | 2/1997 | Esser | 524/522 |
| 5,605,953 A | 2/1997 | Esser | 524/522 |
| 5,609,965 A | 3/1997 | Esser | 428/522 |
| 5,616,764 A | 4/1997 | Lavoie et al. | 556/482 |
| 5,661,212 A | 8/1997 | Lear et al. | 524/555 |
| 5,672,379 A | 9/1997 | Schall et al. | 427/137 |
| 5,674,511 A | 10/1997 | Kacher | |
| 5,741,543 A | 4/1998 | Winslow et al. | 427/208.4 |
| 5,763,546 A | 6/1998 | Jung et al. | 525/313 |
| 5,767,199 A | 6/1998 | Bors et al. | 525/153 |
| 5,783,626 A | 7/1998 | Taylor et al. | 524/555 |
| 5,821,294 A | 10/1998 | Perlinski | |
| 5,891,950 A * | 4/1999 | Collins | 524/502 |
| 5,939,482 A | 8/1999 | Kreissmann et al. | 524/460 |
| 5,990,224 A | 11/1999 | Raynolds et al. | 524/501 |
| 5,998,543 A * | 12/1999 | Collins | 524/808 |

FOREIGN PATENT DOCUMENTS

| | | |
|---|---|---|
| EP | 341886 | 11/1989 |
| EP | 358358 | 3/1990 |
| EP | 390370 | 10/1990 |
| EP | 483915 | 5/1992 |
| EP | 0 492 847 A2 | 7/1992 |
| EP | 0 502 573 | 9/1992 |
| EP | 0 552 469 A2 | 7/1993 |
| EP | 555774 | 8/1993 |
| EP | 0 573 142 A1 | 12/1993 |
| EP | 705855 | 4/1996 |
| GB | 1151479 | 5/1969 |
| GB | 1155275 A | 6/1969 |
| JP | 61-21171 | 1/1986 |
| JP | 1-229242 | 9/1989 |
| JP | 3-6236 | 1/1991 |
| JP | 4-189874 | 7/1992 |
| JP | 6-121171 | 4/1994 |
| JP | 11-323059 | 11/1999 |
| WO | WO 91/14715 | 10/1991 |
| WO | WO 95/00573 | 1/1995 |
| WO | WO95/09209 | 4/1995 |
| WO | WO 96/16998 | 6/1996 |
| WO | WO96/32424 A2 | 10/1996 |
| WO | WO 97 45468 | 12/1997 |

OTHER PUBLICATIONS

William C. Griffin, "Calculation of HLB Values of NonIonic Surfactants," Journal of the Society of Cosmetic Chemists, pp. 249–256, XP 000671451.

R. Heusch, "Eine experimentelle Methode zur Bestimmung des HLB–Wertes von Tensiden," Kolloid–Zeitschrift & Zeitschrift für Polymere, Darmstadt BRD, pp. 31–37, Band 236–238. 1970.

Kirk–Othmer, "Encyclopedia of Chemical Technology", Wiley–Interscience, New York, XP002091794, 3rd. ed., "Emulsions", vol. 8, pp. 900–915.

Derwent Abstract of JP03020302, Jan. 29, 1991.

Derwent Abstract of JP60127376, Jul. 08, 1985.

D. Horn, "Polyethylenimine–Physiochemical Properties and Applications," reprinted from "(IUPAC) Polymeric Amines and Ammonium Salts," pp. 333, and 345–351, 1980.

Nishihata et al., "Formation and Hydrolysis of Enamine in Aqueous Solution" Chem. Pharm. Bull., pp. 4545–4550, Jan. 26, 1984.

Rector et al., "Applications for the Acetoacetyl Functionality in Thermoset Coatings," Water–Borne and Higher Solid Coating Symposium, Feb. 3, 1988.

Lee et al., "Effects of Surfactants and Polymerization Methods On The Morphology of Particles Formed in 'Core–Shell' Emulsion Polymerization of Methyl Methacrylate and Styrene" Makromol. Chem., Sep. 8, 1989, pp. 655–661.

"For Your Unlimited Imagination: Polymin (Polyethylenimine)" 1992 BASF Corporation.

Moszner et al. "Reaction behaviour of monomeric β–ketoesters" Polymer Bulletin 32, 1994, pp. 419–426.

Keith M. Moody, "Waterborne Acrylic Emulsion Using AAEM" Technical Tips, Eastman Kodak Company Sep. 1, 1995.

Geruink et al., "Analytical aspects and film properties of two–pack acetoacetate functional latexes," *Progress in Organic Coatings*, vol. 27, Jan.–Apr. 1996, pp. 73–78.

* cited by examiner

STABLE WATERBORNE POLYMER COMPOSITIONS CONTAINING POLY (ALKYLENIMINES)

This application is a continuation-in-part of U.S. Pat. application Ser. No. 09/022,802, filed Feb. 13, 1998 now U.S. Pat. No. 6,005,035, which claims benefit of U.S. Provisional Application No. 60/059,506, filed Sep. 18, 1997, the disclosures of which are herein incorporated by reference.

FIELD OF THE INVENTION

This invention belongs to the field of emulsion chemistry. In particular, it relates to stable waterborne polymer compositions useful in a variety of adhesive formulations.

BACKGROUND OF THE INVENTION

In an increasing number of industries, aqueous coating compositions continue to replace traditional organic solvent-based coating compositions, as the use of solvents other than water is becoming more and more undesirable due to solvent expense and the cost and hazards involved in controlling solvent vapors. Paints, inks, sealants, and adhesives such as pressure sensitive or laminating adhesives, for example, previously formulated with organic solvents, are now formulated as aqueous compositions. This reduces potentially harmful exposure to volatile organic compounds (VOC's) commonly found in solvent-based compositions. While the move from organic solvent-based to aqueous compositions brings health and safety benefits, loss of one or more physical properties may often result from substitution of waterborne latexes or hot melts for solvent-based polymer systems. Accordingly, the aqueous coating compositions must meet or exceed the performance standards expected from solvent-based compositions. The need to meet or exceed such performance standards places a premium on the characteristics and properties of waterborne polymer compositions used in aqueous coating compositions, such as adhesives.

Waterborne polymers having various functional groups have been used to impart and achieve desired properties to a particular coating composition. For example, a coating composition should exhibit good film formation, print and block resistance, as well as adhesion and tensile properties. Polymers having acetoacetoxy- and enamine-functional groups represent one example of waterborne polymers which have such properties, may carry different functional groups, and are useful in aqueous coating compositions.

For example, U.S. Pat. No. 5,296,530 discloses a quick-curing coating prepared from a polymer having acetoacetyl groups, in which substantially all of the acetoacetyl groups have been converted to enamine functional groups. This conversion occurs, for example, by treatment with ammonia or a primary amine. Coatings so prepared cure more quickly under sunlight or ultraviolet light than coatings which contain the acetoacetyl functional polymer but which have not been converted to an enamine form.

U.S. Pat. Nos. 5,484,975 and 5,525,662 describe the preparation of polymers containing functional acetoacetate groups and then, following the polymerization, reacting the acetoacetate group with a functional amine to form an enamine. The resulting polymers are reported to have a variety of uses including coatings, sealants, adhesives, and saturant applications.

U.S. Pat. No. 5,498,659 discloses polymeric formulations comprising an aqueous carrier, at least one polymeric ingredient, a non-polymeric polyfunctional amine, and a base. The polymeric ingredient has both acid-functional and acetoacetoxy-type functional moieties. The aqueous polymeric formulations produce crosslinked polymeric surface coatings on a substrate.

Japanese Patent Application No. 61-21171 describes a fast-curing adhesive of two separate liquids. The first liquid is an aqueous solution and/or aqueous emulsion of a polymer compound containing an acetoacetyl group. The second liquid consists of polyethylenimine. However, according to this disclosure, in order to achieve fast-curing adhesive properties, the adhesive must be applied as two separate liquids.

U.S. Pat. No. 5,362,816 describes a pressure-sensitive adhesive containing an acetoacetate functional monomer in a low Tg emulsion polymer. The pressure sensitive adhesive is a polymer prepared by free radical emulsion polymerization having a Tg below about 0° C. and has pendent acetoacetate functional groups. The pendent acetoacetate groups are reacted with ammonia or a primary amine to form an enamine-containing composition at a pH greater than 9.

U.S. Pat. No. 5,278,227 describes inherently tacky, emulsion pressure-sensitive adhesive polymers prepared from a specified mixture of monomers. The monomer mixture comprises about 35 to about 65 percent by weight alkyl acrylates, about 15 to about 35 percent vinyl esters, about 20 to about 35 percent by weight diesters of a dicarboxylic acid, and up to about 5 percent by weight of an unsaturated carboxylic acid. The glass transition temperature of the polymer is less than about −30° C.

Even with current waterborne polymer formulations, a need remains for improved aqueous adhesive compositions and waterborne polymers for use in those compositions. In particular, a need exists for waterborne polymer compositions which may formulate as a single, stable composition but which undergo crosslinking upon film formation imparting one or more desired properties to the resulting coating. The present invention meets such needs.

SUMMARY OF THE INVENTION

This invention provides stable waterborne polymer compositions which are stabilized against gelling, comprising a stable waterborne polymer composition comprising an acetoacetoxy-type functional polymer, a poly (alkylenimine), and a nonionic surfactant having a hydrophilic-lipophilic balance (HLB) of at least about 17.5.

These stable waterborne polymer compositions are useful in a variety of coating formulations such as, for example, paints, inks, sealants, and adhesives. When used in coating formulations, the stable waterborne polymer compositions of the invention provide adhesion and crosslinking in the final film or coating. The film or coating may be cured at ambient temperatures or may be thermally cured. Methods of preparing stable waterborne polymer compositions are also disclosed, along with methods of stabilizing latex compositions against gelling upon addition of a poly (alkylenimine).

The stable waterborne polymer compositions according to the invention have beneficial adhesive and shear strength properties. Particularly suitable adhesive compositions comprise a mixture of (a) the stable waterborne polymer composition discussed above and (b) a non-acetoacetoxy functional polymer. In this embodiment, the waterborne polymer composition (a) has a glass transition temperature (Tg) of greater than about 0° C. and the non-acetoacetoxy functional polymer (b) has a Tg of from about 20° C. or lower.

Indeed, it has been discovered that the stable waterborne polymer compositions of the present invention can be used in combination with polymer compositions which lack good shear and/or cohesiveness to provide adhesive compositions with improved shear and cohesiveness. Accordingly, the invention also relates to a method for improving the shear and/or cohesion of an adhesive composition comprising an effective amount of a stable waterborne polymer composition (a).

The adhesive compositions according to the invention are particularly suitable for use as pressure sensitive and laminating adhesives. Accordingly, in another embodiment, the invention relates to pressure sensitive adhesives and laminating adhesives comprising the adhesive compositions of the invention discussed above.

The invention also relates to improved methods employing laminating adhesives and pressure sensitive adhesives. In particular, the invention relates to an improved method for laminating a first substrate to a second substrate comprising applying an adhesive composition to a surface of the first substrate and pressing the surface of the first substrate against the second substrate. The improvement is that the adhesive composition comprises a mixture of (a) a stable waterborne polymer composition having a Tg of greater than about 0° C. and comprising an acetoacetoxy-type functional polymer, a poly(alkylenimine), and a nonionic surfactant having a hydrophilic-lipophilic balance (HLB) of at least about 17.5 and (b) a non-acetoacetoxy functional polymer having a Tg of about 20° C. or lower. Alternatively, the adhesive composition may be simultaneously applied to both substrates while the substrates are pressed together.

Further, in yet another embodiment, the invention relates to an improved method of making a substrate bearing a coating of a pressure sensitive adhesive on at least one surface thereof comprising applying an adhesive composition to a surface of a substrate, the improvement wherein the adhesive composition comprises a mixture of (a) a stable waterborne polymer composition having a Tg of greater than about 0° C. and comprising an acetoacetoxy-type functional polymer, a poly(alkylenimine), and a nonionic surfactant having hydrophilic-lipophilic balance (HLB) of at least about 17.5 and (b) a non-acetoacetoxy functional polymer having a Tg of about 0° C. or lower.

DETAILED DESCRIPTION OF THE INVENTION

The present invention provides stable waterborne polymer compositions, that is, compositions containing a polymer and water. Waterborne polymer compositions include, but are not limited to, latexes, dispersions, microemulsions, or suspensions. Waterborne polymer compositions of the present invention are stable and may be stored at room temperature or moderately above room temperature (e.g., about 50 to 60° C.) and provide adhesion and crosslinking upon film formation when applied to a substrate. Yet, a film or coating formed with polymers of the invention may be cured at room temperature (ambient cure) or at elevated temperatures (thermal cure).

The polymers used to prepare the waterborne polymer composition of the present invention are generally prepared as particles. The particles may be structured or unstructured. Structured particles include, but are not limited to, core/shell particles and gradient particles. The average polymer particle size may range from about 25 to about 600 nm.

The polymer particles generally have a spherical shape. In one embodiment, the generally spherical polymeric particle may have a core portion and a shell portion. The core/shell polymer particles may also be prepared in a multilobe form, a peanut shell, an acorn form, or a raspberry form. It is further preferred in such particles that the core portion comprises about 20 to about 80 percent of the total weight of said particle and the shell portion comprises about 80 to about 20 percent of the total weight volume of the particle.

Although the following description will be directed to a discussion of specific types of polymers, it may be seen from the examples that other waterborne latex polymers that are susceptible to gelling upon addition of a poly(alkylenimine) are within the scope of the present invention.

Enamine-functional polymers represent a preferred embodiment of polymers used to form the stable waterborne polymer compositions of the present invention. Enamine-functional polymers may be prepared by reacting a polymer having acetoacetoxy groups with ammonia or a primary or secondary amine. The primary or secondary amine may be a monoamine compound or a polyamine compound. Preferred amines include, for example, triaminononane, $H_2N(CH_2)_3CH(CH_2NH_2)(CH_2)_4NH_2$ (CAS Registry No. 1572-55-0), available from Monsanto, or, as described below, polyethylenimine, (PEI). In water-based latexes, the enamine functionality serves to further stabilize the acetoacetoxy-groups and protect them from hydrolysis. Enamine-functional polymers have been described in Moszner et al., Polymer Bulletin 32, 419–426 (1994); European Patent Application No. 0 492 847 A2; U.S. Pat. No. 5,296,530; and U.S. Pat. No. 5,484,849. These documents are incorporated herein by reference in their entireties.

Acetoacetoxy-type functional polymers useable in the present invention may be prepared by free radical emulsion polymerization of vinyl monomers having an acetoacetoxy functionality such as those of Formula (I) below with other vinyl monomers. This combination of monomers provides water-based dispersion of polymer particles where the polymer has pendant acetoacetoxy groups. As used here, a "vinyl" monomer is an ethylenically unsaturated monomer. A pendant acetoacetoxy group is not strictly limited to those at the termini of the polymer. Pendant acetoacetoxy groups also include groups attached to the polymer's backbone and available for further reaction.

Acetoacetoxy-type functional polymers preferably contain about 0.5 to about 30 weight percent of vinyl monomers having acetoacetoxy-type functionality such as those of Formula I, and about 99.5 to about 70 weight percent of other vinyl monomers, preferably alkyl (meth)acrylates having 1 to 18 carbons. The weight percentage is based on the total amount of monomers in the composition. More preferably, the stabilized polymer has about 1 to about 15 weight percent acetoacetoxy monomers, and about 99 to about 85 weight percent of other vinyl monomers.

Aspects of this emulsion polymerization and preferred embodiments are discussed below beginning with vinyl monomers as in Formula (I) which have an acetoacetoxy-type functionality.

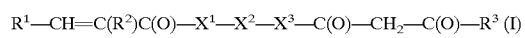

$R^1—CH=C(R^2)C(O)—X^1—X^2—X^3—C(O)—CH_2—C(O)—R^3$ (I)

For an acetoacetoxy-type monomer of Formula (1), $R^1$ is a hydrogen or halogen. $R^2$ is a hydrogen, halogen, $C_1–C_6$ alkylthio group, or $C_1–C_6$ alkyl group. $R^3$ is a $C_1–C_6$ alkyl group. $X^1$ and $X^3$ are independently O, S, or a group of the formula -N(R')-, where R' is a $C_1–C_6$ alkyl group. $X^2$ is a $C_2–C_{12}$ alkylene group or $C_3–C_{12}$ cycloalkylene group. The alkyl and alkylene groups described here and throughout the specification may be straight or branched groups. Preferred monomers of Formula (I) are acetoacetoxyethyl methacrylate, acetoacetoxyethyl acrylate, acetoacetoxy (methyl)ethyl acrylate, acetoacetoxypropyl acrylate, allyl acetoacetate, acetoacetamido-ethyl (meth)acrylate, and acetoacetoxybutyl acrylate. Acetoacetoxyethyl methacrylate (AAEM) represents a particularly preferred monomer of Formula (I).

Suitable other vinyl monomers which may be reacted with the vinyl monomers having acetoacetoxy-type functionality include, but are not limited to, methyl acrylate; methyl methacrylate; ethyl acrylate; ethyl methacrylate; butyl acrylate; butyl methacrylate; isobutyl acrylate; isobutyl methacrylate; ethylhexyl acrylate; ethylhexyl methacrylate; octyl acrylate; octyl methacrylate; styrene; α-methyl styrene; glycidyl methacrylate; carbodiimide methacrylate; $C_1$–C18 alkyl crotonates; di-n-butyl maleate; dioctylmaleate; allyl methacrylate; di-allyl maleate; di-allylmalonate; methoxybutenyl methacrylate; isobornyl methacrylate; hydroxybutenyl methacrylate; hydroxyethyl (meth)acrylate; hydroxypropyl (meth)acrylate; acrylonitrile, vinyl chloride; ethylene; methacrylamide; acrylamide; butyl acrylamide; ethyl acrylamide; vinyl (meth)acrylate; isopropenyl (meth)acrylate; cycloaliphatic epoxy (meth)acrylates; and ethylformamide. Such monomers are described in "The Brandon Worldwide Monomer Reference Guide and Sourcebook" Second Edition, 1992, Brandon Associates, Merrimack, N.H.; and in "Polymers and Monomers", the 1996–1997 Catalog from Polyscience, Inc., Warrington, Pa.

Vinyl esters of the general Formula (II) represent further examples of useful other vinyl monomers:

RCH=CH—O—C(O)—C(R)$_3$ (II)

In Formula (II), R is independently hydrogen or an alkyl group of up to 12 carbon atoms. Particular monomers of Formula (II) include $CH_2$=CH—O—C(O)—$CH_3$, $CH_2$=CH—O—C(O)—C$(CH_3)_3$, $CH_2$=CH—O—C(O)—CH$(C_2H_5)(C_4H_9)$, and $CH_2$=CH—O—C(O)—$CH_2CH_3$. Vinyl ester monomers also include vinyl esters of vinyl alcohol such as the VEOVA series available from Shell Chemical Company as VEOVA 5, VEOVA 9, VEOVA 10, and VEOVA 11 products. See O. W. Smith, M. J. Collins, P. S. Martin, and D. R. Bassett, Prog. Org. Coatings 22, 19 (1993).

Optional monomers that may be incorporated into the polymer include styrene, butyl styrene, vinyl toluene, a:-methyl styrene, (meth)acryl-amide, (meth)acrylonitirle, vinyl acetate, and vinyl esters of acids other than acetic acid, itaconic anhydride, maleic anhydride, vinyl formate, and salts of 2-sulfoethyl (meth)acrylate.

In one embodiment, the acetoacetoxy functional polymer may also incorporate nitrogen-containing, vinyl monomers known to promote wet adhesion. Exemplary wet adhesion monomers include, for example, t-butylaminoethyl methacrylate; dimethylaminoethyl methacrylate; diethyl-5 aminoethyl methacrylate; N,N-dimethylaminopropyl methacrylamide; 2-t-butylaminoethyl methacrylate; N,N-dimethylaminoethyl acrylate; N-(2-methacrylamido-ethyl) ethylene urea; and N-(2-methacryloyloxy-ethyl)ethylene urea. N-(2-methacryloyloxyethyl)ethylene urea is available from RohmTech as 50% solution in water under the Rohamere 6852-O trade name and as a 25% solution in water under the Rohamere 6844 trade name. N-(2-methacrylamidoethyl)ethylene urea is available from Rhone-Poulenc under the WAM trade name.

Small amounts of acid vinyl monomers may also be used to prepare acetoacetoxy emulsion polymers according to the invention. Such acid vinyl monomers include, for example, acrylic acid, methacrylic acid, crotonic acid, itaconic acid, maleic acid, fumaric acid, and 2-acrylamido-2-methyl-1-propanesulfonic acid (sodium, potassium, or ammonium salts). Generally these monomers are used in small amounts. Preferably, the amount of acid vinyl monomers may range, for example, from 0 to 5 phr. Larger amounts of acid vinyl monomers may be used to achieve a desired effect, such as increased viscosity.

The acetoacetoxy polymer may be prepared using emulsion polymerization techniques known in the art. The acetoacetoxy polymer may, as is known in the art, be prepared using free radical emulsion polymerization techniques which yield structured or unstructured particles. As mentioned above, structured particles include, for example, core/shell particles, raspberry particles, and gradient particles. Chain transfer agents, initiators, reducing agents, catalysts, and surfactants known in the art of emulsion polymerization, may be used to prepare the polymers.

Chain transfer agents may optionally be added, in an amount up to about 2 weight percent based on total monomer content, to control the molecular weight of the polymer. Use of chain transfer agents may be preferred when it is desired to obtain low molecular weight polymers. Exemplary chain transfer agents are butyl mercaptan, mercaptopropionic acid, 2-ethylhexyl mercaptopropionate, dodecylmercaptan, n-butyl mercaptopropionate, octyl mercaptan, isodecyl mercaptan, octadecyl mercaptan, mercaptoacetic acid, allyl mercaptopropionate, allyl mercaptoacetate, crotyl mercaptopropionate, crotyl mercaptoacetate, and the reactive chain transfer agents taught in U.S. Pat. No. 5,247,040, incorporated here by reference. In particular, 2-ethylhexyl mercapto-propionate and dodecylmercaptan represents preferred chain transfer agents.

Typical initiators include hydrogen peroxide, sodium, potassium or ammonium peroxydisulfate, dibenzoyl peroxide, lauryl peroxide, ditertiary butyl peroxide, 2,2'-azobisisobutyronitrile, t-butyl hydroperoxide, benzoyl peroxide, and the like.

Suitable reducing agents are those which increase the rate of polymerization and include for example, sodium bisulfite, sodium hydrosulfite, sodium formaldehyde sulfoxylate, ascorbic acid, isoascorbic acid, and mixtures thereof.

Polymerization catalysts are those compounds which increase the rate of polymerization and which, in combination with the above described reducing agents, may promote decomposition of the polymerization initiator under the reaction conditions. Suitable catalysts include transition metal compounds such as, for example, ferrous sulfate heptahydrate, ferrous chloride, cupric sulfate, cupric chloride, cobalt acetate, cobaltous sulfate, and mixtures thereof. Peroxide-iron and peroxide-sulfite redox catalysts may also be used.

Crosslinking agents may optionally be added, in an amount up to about 2 weight percent, based on total monomer content, to control the molecular weight of the polymer. Use of crosslinking agents may be preferred when it is desired to obtain high molecular weight polymers. Useful crosslinkers include trimethylolpropane tri(meth)acrylate, 1,6-hexanediol di(meth)acrylate, allyl methacrylate and the like.

Any conventional polymerization surfactant may be used to form the polymers of the present invention. Useful surfactants include, but are not limited to, ionic and nonionic surfactants such as alkyl polyglycol ethers; alkyl phenol polyglycol ethers; alkali metal ammonium salts of alkyl, aryl or alkylaryl sulfonates, sulfates, phosphates, and the like, and reactive anionic or nonionic surfactants possessing styrene or allyl groups. Sulfonate containing surfactants such as sodium dodecyl benzene sulfonate, sodium dodecyl sulfate, or the diesters of sodiosulfosuccinic acid such as sodium dioctylsulfo-succinate, and alpha olefin sulfonates are suitable. When persulfate catalysts are used, in-situ-generated oligomers with sulfate end groups may act as surfactants.

Although the above list of useful surfactants may include some of the same surfactants listed below for post polymerization addition, incorporation of these particular surfactants into the polymerization process is a less preferred method of stabilizing the polymer against gelling upon addition of poly(alkylenimine) and upon adjustment of pH of the polymer. Although they may be used in the emulsion polymerization process, they may contribute to processing problems such as increased particle size and increased amounts of coagulum in the polymer.

The type and amount of surfactant used in the polymerization process depends on the specific composition, reaction conditions, and the desired final particle size, as is known in the art.

Water-dispersible and water-soluble polymers may also be employed as surfactants/stabilizers in the water-based latexes of the invention. Examples of such polymeric stabilizers include water-dispersible polyesters as described in U.S. Pat. Nos. 4,946,932 and 4,939,233; water-dispersible polyurethanes as described in U.S. Pat. Nos. 4,927,876 and 5,137,961; alkali-soluble acrylic resins as described in U.S. Pat. No. 4,839,413; and hydroxyethyl cellulose, as described in U.S. Pat. No. 3,876,596 and British Patent 1,155,275.

The acetoacetoxy functionality in the polymer may be present as free acetoacetoxy groups or as derivatives of those groups such as, for example, an enamine group or acetoacetamide group. The acetoacetoxy-functional polymer may contain both free acetoacetoxy groups and acetoacetoxy derivatives.

As discussed above, enamine-functional polymers may be prepared by addition of a primary or secondary amine to the acetoacetoxy polymer. Preferred amines are poly (alkyleneimines). Poly(alkylenimines) for use in the invention may have a weight average molecular weight of about 200 to about 750,000. The poly(alkylenimine) is preferably a poly(ethylenimine) (PEI) and more preferably PEI having a weight average molecular weight of about 800 to about 25,000. The PEI may contain primary, secondary, and tertiary amine groups, for example, in a ratio of 1.5:1.4:1.0, respectively. Such PEI compounds are commercially available from BASF Corporation as LUPASOL™ G-35 poly (ethylenimine). Depending on the requirements of the end-use of the formulation, the content of polyethylenimine can vary from 0.5 to 25 weight percent based on the dry weight of the acetoacetoxy polymer. More preferably, the content of polyethylenimine can vary from 2 to 12 weight percent based on the dry weight of the acetoacetoxy polymer.

However, poly(alkylenimines), particularly poly (ethylenimine), are known to flocculate latexes, and are actually sold for that purpose. The pH of the prepared latex is normally greater than 11, much too high for many commercial applications. After addition of a poly (alkylenimine), upon adjustment of the pH of the latex to a pH of less than about 10, the latex normally gels.

It has been unexpectedly found that the thus formed waterborne polymer compositions may be stabilized against gelling due to the addition of poly(alkylenimine), by post polymerization addition of a surfactant. Preferably the surfactant is a nonionic surfactant having a hydrophilic-lipophilic (HLB) value of at least about 17.5. The surfactant may be added either prior to, with or after addition of the poly(alkylenimine), but before adjusting the pH of the polymer. The choice of surfactant for post polymerization addition to the emulsion polymer does not depend on the chemical structure of the surfactant, but only on the surfactant having an HLB value of at least about 17.5. In contrast to polymers that flocculate upon addition of a poly (alkylenimine), the addition of a poly (alkyleneimine), particularly poly(ethylenimine), to polymers to which surfactants having an HLB of at least about 17.5 has been added, does not cause flocculation, but provides a stable, waterborne polymer composition.

The addition of poly(ethylenimine) may be accomplished by adding, with stirring, poly(ethylenimine) to an emulsion of the acetoacetoxy polymer to which has also been added a nonionic surfactant having an HLB value of at least about 17.5. Sufficient surfactant should be added to stabilize the waterborne polymer composition. Typically, the surfactant may be added in an amount of from about 0.5 phr to about 5 phr based on dry polymer weight. Optionally, the surfactant may be added, with stirring, with the poly(ethylenimine) or after addition of the poly(ethylenimine); but prior to adjusting the pH of the polymer. Other surfactants and property modifying ingredients may also be added that do not impact on the stability of the waterborne composition.

The pH of the stable waterborne polymer composition of the invention comprising an acetoacetoxy-type functional polymer, a poly(alkylenimine), and a nonionic surfactant may be adjusted by the addition of an acid or buffer. For example, buffers such as sodium bicarbonate, ammonium bicarbonate, ammonium dihydrogenphosphate, an ammonium polyacrylate, or a mixture of such buffers may be used. The buffer, such as ammonium bicarbonate, may generally be added to the stable waterborne polymer composition to adjust and/or buffer the pH of the composition to less than about 10. Waterborne polymer compositions having pH values in the range of about 7.0 to about 9.8, preferably about 8.4 to about 9.2, may be achieved using ammonium buffers. Buffered compositions of the invention are particularly useful in coating formulations.

The stable waterborne polymer compositions of the present invention will vary in properties, depending on the end-use application. In general, the polymer composition may have a glass transition temperature (Tg) of −50 to +100° C.; more preferably, −35 to +50° C. When used, for example, in an adhesive composition, the glass transition temperature of the polymer composition may range from about 0 to about 100° C.

The weight average molecular weight of the stable waterborne polymers may vary from about 20,000 to 5,000,000 daltons; more preferably from 100,000 to 2,000,000 and most preferably from 200,000 to 1,000,000. The molecular weight range may be controlled by reaction conditions, as is known in the art, or by the use of a chain transfer agent or crosslinkers, as discussed above.

In a waterborne composition of the invention, the stable waterborne polymers may be present from about 5 to about 65 weight percent based on dry resin and more preferably from about 25 to about 55 weight percent. The examples below illustrate the preparation of polymers and water-based compositions according to the invention.

The stable waterborne polymers may be in the form of small particle size polymers, such as those ranging from about 25 to about 600 nm and more preferably from about 80 to about 400 nm.

As discussed above, the stable waterborne polymer compositions are useful in a variety of coating formulations including adhesive compositions. Accordingly, the invention also relates to an adhesive composition comprising a mixture of (a) a stable waterborne polymer composition having a Tg of greater than about 0° C. and comprising an acetoacetoxy-type functional polymer, a poly(alkylenimine), and a nonionic surfactant having a hydrophilic-lipophilic balance (HLB) of at least about 17.5 and (b) a non-acetoacetoxy functional polymer having a Tg of about 20° C. or lower.

Indeed, it has been discovered that the stable waterborne polymer composition of the invention can be used in combination with polymer combinations which lack good shear and/or cohesiveness to provide adhesive compositions with improved shear and cohesiveness. Accordingly, the non-acetoacetoxy functional polymer (b) of the adhesive compositions of the present invention is not particularly limited, so long as it does not react with the poly(alkylenimine) of waterborne polymer composition (a) and is stable at the pH of formulation, which, as discussed above, can vary. Examples of suitable non-acetoacetoxy functional polymers include, but are not limited to, water dispersible polymers such as polyester-amides, alkyds, polyurethanes, polyamides, acrylics, vinyl polymers, polymers having pendant allyl groups such as described in U.S. Pat. No. 5,539,073, styrene-butadiene polymers, and vinylacetate-ethylene copolymers or mixtures thereof. Acrylic and vinyl acrylic polymers are the preferred non-acetoacetoxy polymers for use in the present invention. Suitable acrylic and vinyl acrylic polymers include, but are not limited to, methyl acrylate; methyl methacrylate; ethyl acrylate; ethyl methacrylate; butyl acrylate; butyl methacrylate; isobutyl acrylate; isobutyl methacrylate; ethylhexyl acrylate; ethylhexyl methacrylate; octyl acrylate; octyl methacrylate; glycidyl methacrylate; carbodiimide methacrylate; allyl methacrylate; methoxybutenyl methacrylate; isobornyl methacrylate; hydroxybutenyl methacrylate; hydroxyethyl (meth)acrylate; hydroxypropyl (meth)acrylate; methacrylamide; acrylamide; butyl acrylamide; ethyl acrylamide; vinyl (meth) acrylate; isopropenyl (meth)acrylate; and cycloaliphatic epoxy (meth)acrylates.

Generally, the non-acetoacetoxy functional polymer may be present from about 5 to about 65 weight percent based on dry resin and more preferably from about 25 to about 55 weight percent.

The glass transition temperature (Tg) of the non-acetoacetoxy functional polymer is not particularly limited and varies depending upon the properties required of the resulting adhesive. Typically, the Tg of the non-acetoacetoxy functional polymer is about 20° C. or less. For example, for pressure sensitive adhesive applications, the Tg of the non-acetoacetoxy functional polymer may be about 0° C. or less, preferably less than about −20° C. For laminating adhesive compositions, a preferred Tg of the non-acetoacetoxy functional polymer is from about −20° C. to about 20° C.

The ratio of the amount of the stable waterborne acetoacetoxy polymer composition (a) to the non-acetoacetoxy functional polymer (b) used in the adhesive compositions of the invention varies depending upon the desired adhesive properties. Generally, this ratio varies from about 1:10 to 4:1. For example, for applications such as pressure sensitive adhesives, the adhesive may comprise between about 2% to about 50% of the stable waterborne acetoacetoxy polymer composition (a) based on the combined weight of the stable waterborne acetoacetoxy polymer composition (a) and the non-acetoacetoxy functional polymer (b). Preferably, the acetoacetoxy polymer composition is present at about 2% to about 35%, and more preferably, between about 2% and about 25%. For laminating adhesives, the waterborne polymer composition may comprise between about 2% to about 50% of the stable waterborne acetoacetoxy polymer composition (a) based on the combined weight of the stable waterborne acetoacetoxy polymer composition (a) and the non-acetoacetoxy functional polymer (b). Preferably, the acetoacetoxy polymer composition is present at about 2% to about 35%, and more preferably, between about 2% and about 30%. However, these percentages are merely illustrative and can be affected by dilution of the compositions, for example, with water. Further, the above-mentioned ratios may vary according to the adhesive properties desired.

As mentioned above, adhesive compositions comprising a stable waterborne acetoacetoxy polymer composition of the present invention and a non-acetoacetoxy functional polymer are particularly suitable for use as pressure sensitive adhesives and as laminating adhesives. A discussion of pressure sensitive adhesives and their applications may be found in U.S. Pat. No. 5,362,816, the disclosure of which is herein incorporated by reference in its entirety. A discussion of lamination adhesives and their applications may be found, for example, in U.S. Pat. Nos. 5,891,950 and 5,821,294, the disclosures of which are herein incorporated by reference in their entireties.

Pressure-sensitive adhesives (PSAs) are used in the manufacture of a variety of articles such as adhesive tapes and other materials which are intended to be easily attachable to another substrate by the application of pressure alone. Many adhesives preferably have a balance of one or more properties such as tackiness at the temperature of use, adhesion (peel resistance), cohesion (shear resistance), elongation, elasticity, color clarity and color stability, and resistance to sunlight and other ultraviolet and degrading radiation sources.

The suitability of pressure-sensitive adhesive compositions is also influenced to a large extent by the ease of manufacture of both the adhesive and of articles containing the adhesive and by environmental and personnel safety hazards. For instance, PSAs are typically applied to a backing as hot melts, polymer solutions or as dispersions of a polymer in an aqueous medium. Such solutions and dispersions must possess properties which facilitate their use in the manufacture of PSA-containing articles. Thus, the melt, solution or dispersion, as well as the polymer per se, must adequately wet the backing to assure adequate adhesive distribution, coverage and bonding to the backing.

Various formulating agents may be added to the pressure sensitive adhesive compositions of the present invention to the extent that such additives are compatible with the adhesive compositions. Suitable additives are taught, for example, by U.S. Pat. Nos. 5,122,567, 5,362,816, and 5,821,294, the disclosures of which are herein incorporated by reference. Such additives include, but are not limited to, protective colloids, tackifiers, fillers and/or extenders such as dispersible clays, colorants such as pigments and dyes, solvents, thickeners, plasticizers, coalescing agents, preservative agents such as biocides, fungicides, and mildewcides, buffers, agents to adjust pH, surfactants, and catalysts.

The pressure sensitive adhesive compositions according to the invention can be used to make a substrate bearing a coating of a pressure sensitive adhesive. The method comprises applying an adhesive composition to a surface of a substrate, wherein the adhesive composition comprises a mixture of (a) a stable waterborne polymer composition having a Tg of greater than about 0° and comprising an acetoacetoxy-type functional polymer, a poly(alkylenimine), and a nonionic surfactant having a hydrophilic-lipophilic balance (HLB) of at least about 17.5 and (b) a non-acetoacetoxy functional polymer.

The pressure-sensitive adhesives of the present invention can be applied to any backing which it is desired to adhere to another surface or article. Illustrative backings include flexible and rigid (solid), natural and synthetic materials such as plastics, elastomers, solid metals and foils, ceramics (tiles, glass, and the like), wood, papers and cardboard, leather materials, etc. of essentially any form including films, solid articles, woven and non-woven textile materials, and the like. Illustrative uses of such articles include wall coverings (paper, fabric, films, and the like), upholstery items, construction roofing and siding materials, tapes of all varieties (including those having backings comprised of woven or non-woven fabrics, paper, polymeric films, metal foils, foams, etc., including double-faced tapes and so-called transfer tapes), packaging, floor and wall tile, other floor and wall coverings, and paneling, and the like.

Suitable backing and substrate materials can be of essentially any chemical composition and include, for example, metals, ceramics (including glass), and natural and synthetic polar and non-polar materials such as polyolefins, e.g., homopolymers and interpolymers of substituted and non-substituted olefinically unsaturated hydrocarbons including ethylene, propylene, styrene, butadiene, dicyclopentadiene, etc., and materials which typically contain polar functional groups such as hydroxy, etheral, carbonyl, carboxylic acid (including carboxylic acid salts), carboxylic acid esters (including thio esters), amides, amines, and the like. Essentially all natural materials include one or more polar functional groups. Illustrative are virgin and reclaimed cellulosic fibers such as cotton, paper, wood, coconut fiber, jute, hemp, and the like, and proteinaceous materials such as leather, wool, and other animal fur. Illustrative synthetic materials containing polar functional groups are polyesters, polyamides, carboxylated styrene-butadiene polymers, etc., such as Nylon-6, Nylon-66, Nylon-610, "Dacron", "Fortrel", "Kodel", "Acrilan", "Orlon", "Creslan", "Verel" and "Dynel". Illustrative of other useful materials which are also polar are synthetic carbon, silicon, and magnesium silicate (e.g., asbestos). Preferred substrates or backings for the adhesive composition of the present invention are polypropylene, polyethylene, polyethylene terephthalate, and polyvinyl chloride.

The adhesive compositions of the present invention may be applied to the backing by any one of a variety of conventional coating techniques such as roll coating, spray coating, and curtain coating. They also may be applied to the backing without modification by extrusion coating, coextrusion, and hot melt coating by employing suitable conventional coating devices known for such coating methods. While primers may be employed to pretreat the backing, they are unnecessary in many applications. Dry coating weight (the weight of dry adhesive applied per unit surface area) can vary substantially depending upon the porosity and irregularity of the backing and of the substrate surface to which the backing is to be adhered, and other factors. For instance, higher polymer loadings are preferred for adhering porous, irregular ceramic tiles to porous surfaces, while lower adhesive loadings are usually required to manufacture tapes, films, and other articles from relatively non-porous, smooth-surfaced materials such as synthetic polymer films and sheets. When the adhesive is applied to non-porous polymeric or metallic substrates intended for adhesion to non-porous polymeric or metallic surfaces, adhesive loadings of about 5 to about 50 pounds of dry adhesive per 3,000 square feet of treated surface are generally adequate.

Adequate adhesion in tapes manufactured from continuous sheet polymeric substrates can usually be achieved with dry coating adhesive weights of about 10 to about 20 pounds per 3,000 square feet of treated surface, while coating weights of 20 to about 40 pounds per 3,000 square feet are usually employed for paper-backed tapes such as masking tapes.

As mentioned above, the adhesive compositions of the present invention are also suitable for use as laminating adhesives. Adhesive lamination is often used in association with flexible packaging material, but is not limited thereto. All of the materials listed above as substrates or backings for the pressure sensitive adhesives may be laminated utilizing the adhesive compositions of the present invention. Preferred substrates or backings are polypropylene, polyethylene, polyethylene terephthalate, and polyvinyl chloride.

In an embodiment of the invention, a first substrate may be laminated to a second substrate with an adhesive composition of the present invention by applying an adhesive composition to a surface of the first substrate and/or the second substrate and pressing the first and second substrates together. The inventive adhesive composition utilized in the laminating process comprises a mixture of (a) a stable waterborne polymer composition having a Tg of greater than about 0° C. and comprising an acetoacetoxy-type functional polymer, a poly(alkylenimine), and a nonionic surfactant having a hydrophilic-lipophilic balance (HLB) of at least about 17.5 and (b) a non-acetoacetoxy functional polymer having a Tg of about 20° C. or lower.

Alternatively, the adhesive composition may be simultaneously applied to both substrates while the substrates are pressed together. For example, the first and second substrates may be pressed together by passing the substrates through a two roll nip. The inventive adhesive composition may be injected through an opening of the nip and towards the first and/or second substrate. Illustratively, the substrates may be laminated using an "in-line" process, which is generally described, for example, in U.S. Pat. No. 5,891,950, the disclosure of which is herein incorporated by reference in its entirety.

Any of the stable waterborne compositions described above for the present invention may be combined with the non-acetoacetoxy-functional polymers described above for use as laminating adhesives. Further, any of the formulating agents described above for the pressure sensitive adhesive compositions may be utilized as part of the inventive laminating adhesive compositions.

The following examples are intended to illustrate, not limit, the invention:

EXAMPLES

Measurement of Glass Transition Temperature (Tg)

The glass transition temperatures (Tg) for the polymer compositions described below were measured using a "second cycle" test as is known to those skilled in the art. In the second cycle method, the glass transition temperature is measured a first time according to standard methods. The sample is cooled back to the starting point, and the glass transition temperature is then determined a second time. This second measurement is often referred to as a "second cycle glass transition temperature."

Example 1—Preparation of a Stable Waterborne Polymer Composition

Latex Synthesis

The reactor configuration was a 4 liter jacketed kettle held at 80° C. with circulating water. Deionized water was used and the atmosphere above the reaction was inerted with nitrogen. The reactor was charged with 1000 g water, 3 g of sodium bicarbonate and 54.5 g (1.5 phm) of Rhodacal A246L surfactant (a $C_{12,14}$ alpha olefin sodium sulfonate surfactant available from Rhone-Poulenc as a 38.5% solution in water), and heated to 80° C. An emulsion was made with 700 g of water, 10.9 g (0.3 phm) of Rhodacal A246L surfactant, 672 g of styrene, 476 g of butyl acrylate, 70 g of 2-hydroxyethyl methacrylate (HEMA), 140 g of acetoacetoxyethyl methacrylate (AAEM) and 84 g of sodium 2-acrylamido-2-methylpropane sulfonate (AMPS 2405 monomer, available from Lubrizol Corporation as a 50% solution in water). To the reactor was added 110 g of the above emulsion, followed by a solution of 2.7 g of sodium persulfate in 20 g of water. After 5 minutes, the remainder of the emulsion was fed to the reactor over a 2 hour period. At the same time a solution of 1.5 g of sodium persulfate in 50 g of water was added to the reactor over a 1 hour period. The reaction mixture was held at 80° C. for 30 minutes after addition was complete, and the reactor was then cooled. As the reactor was cooled, a solution of 1.5 g of t-butylhydroperoxide in 30 g of water was added rapidly through the emulsion feed, and a solution of 1.5 g of sodium metabisulfite, 1.0 g of 50% sodium hydroxide solution and 80 g of water was added over 30 minutes. The pH of the latex was 6.90, the particle size was 77 nm, and the glass transition temperature (Tg) was +38° C.

Addition of PEI

A mixture of 336 g of a 40% solution of LUPASOL™ G-35 polyethylenimine (a 50% solids product of BASF) in water, 60 g of Tergitol 15-S-40 surfactant (70% active, $C_{11}$-$C_{15}$ secondary alcohol ethoxylate with an HLB of 18.0, a product of Union Carbide), and 84 g of water was added to the reactor over 30 minutes with a sub-surface feed. The pH of the latex was 11.2 and the particle size was 81 nm.

pH Adjustment

After 15 minutes, a solution of 5% ammonium carbonate and 15% ammonium bicarbonate in water was added (550 g) to achieve a pH of 9.84. The entire batch filtered rapidly through a 40 mm, 100 mesh stainless steel screen. The pH of the latex was 9.84, the particle size was 80 nm, and percent solids was 37.25%. This waterborne polymer composition showed no significant thickening after 2 weeks at 60° C.

Example 2—Comparative Example 100 g of a latex similar to the one described in Example 1 was treated with the same proportion of PEI, but without post-addition of Tergitol 15-S-40, adjustment of the pH of the latex to 9.8 caused the mixture to gel within ten minutes.

Example 3—Evaluation of Various Nonionic Surfactants

A latex similar to the one described in Example 1 was prepared with a pH of 7.36, was 42.1 % solids and a particle diameter of 74 nm. To 3270 g of this latex was added 330 g of a 40% solution of LUPASOL™ G-35 polyethylenimine (a 50% solids product of BASF) in water. The particle size was 80 nm.

This mixture was then blended with various nonionic surfactants at the rate of 3 g of surfactant (active basis) per 100 g of polymer (dry basis) and pH adjusted to 9.8 with a solution of 5% ammonium carbonate and 15% ammonium bicarbonate. The viscosity of the product was estimated by hand over time. The results with various nonionic surfactants is shown in Table 1. Mixtures containing nonionic surfactants having an HLB of at least about 17.5 were stable, while those with HLB of less than about 17.5 were unstable.

TABLE 1

Nonionic Surfactants

| Surfactant | Type | Class | HLB | RESULT UPON pH ADJUSTMENT to pH 9.8 |
|---|---|---|---|---|
| None (Ex. 2) | — | — | — | Gelled within 15 minutes |
| Igepal ® CO210 | Nonylphenol ethoxylate | Nonionic | 4.6 | Gelled immediately |
| Igepal CO520 | Nonylphenol ethoxylate | Nonionic | 10 | Gelled immediately |
| Igepal CO630 | Nonylphenol ethoxylate | Nonionic | 13 | Gelled 2 minutes |
| Triton ® CF-10 | alkylaryl polyether | Nonionic | 14 | Gelled immediately |
| Igepal CO720 | Nonylphenol ethoxylate | Nonionic | 14.2 | Gelled 15 minutes |
| Tergitol ® NP-40 | Nonylphenol ethoxylate | Nonionic | 17.8 | Stable at 60° C. |
| Igepal CO990 | Nonylphenol ethoxylate | Nonionic | 19 | Stable at 60° C. |
| Igepal DM-970 | Dinonylphenoxy-poly(ethyleneoxy)ethanol | Nonionic | 19 | Stable at 60° C. |
| Tergitol 15-S-7 | secondary alcohol ethoxylate | Nonionic | 12.1 | Gelled immediately |
| Surfonic ® LF-17 | alkyl polyoxyalkylene ether | Nonionic | 12.2 | Gelled immediately |
| Tergitol 15-S-40 | secondary alcohol ethoxylate | Nonionic | 18 | Stable at 60° |
| Span ® 80 | sorbitan monooleate | Nonionic | 4.3 | Gelled 3 minutes |
| Span 20 | sorbitan monolaurate | Nonionic | 8.6 | Gelled immediately |
| Tween ® 85 | PEO (20) sorbitan trioleate | Nonionic | 11 | Gelled immediately |
| Tween 60 | PEO (20) sorbitan monostearate | Nonionic | 14.9 | Gelled 20 minutes 60° oven |
| Tween 40 | PEO (20) sorbitan monopalmitate | Nonionic | 15.6 | Gelled 20 minutes 60° oven |
| Tween 20 | PEO (20) sorbitan monolaurate | Nonionic | 16.7 | Gelled 15 minutes 60° oven |
| Pluronic ® L-61 | EO-PO-EO Block copolymer, 10% EO | Nonionic | 1–7 | Gelled immediately |
| Pluronic P-103 | EO-PO-EO Block copolymer, 30% EO | Nonionic | 7–12 | Gelled immediately |
| Pluronic P-105 | EO-PO-EO Block copolymer 50% EO | Nonionic | 12–18 | Gelled 15 minutes |
| Pluronic F-77 | EO-PO-EO Block copolymer 70% EO | Nonionic | 24 | Stable at 60° |
| Pluronic F-87 | EO-PO-EO Block copolymer 70% EO | Nonionic | 24 | Stable at 60° |
| Pluronic F-127 | EO-PO-EO Block copolymer 70% EO | Nonionic | 18–23 | Stable at 60° |
| Pluronic F-68 | EO-PO-EO Block copolymer 80% EO | Nonionic | 24 | Stable at 60° |
| Pluronic F-108 | EO-PO-EO Block copolymer 80% EO | Nonionic | 24 | Stable at 60° |

TABLE 1-continued

Nonionic Surfactants

| Surfactant | Type | Class | HLB | RESULT UPON pH ADJUST-MENT to pH 9.8 |
|---|---|---|---|---|
| Polyethylene glycol | $M_n$ = 2000, 4600, 8000, 12000 | Nonionic | — | Gelled immediately |
| Poly(ethylene Glycol-co-propylene glycol) | $M_n$ = 2500, 75% EO random copolymer | Nonionic | — | Gelled immediately |
| PO-EO-PO Block copolymer | $M_n$ = 2000, 50% EO or $M_n$ = 2700, 40% EO or $M_n$ = 3300, 10% EO | Nonionic | — | Gelled immediately |
| Press-Wet OC20A | Ethoxyethylated castor oil | Nonionic | Un-known | Gelled immediately |
| Surfynol ® 104E | acetylenic diol | Nonionic | 4 | Gelled immediately |
| Surfynol 440 | ethoxylated acetylenic diol | Nonionic | 8 | Gelled immediately |
| Surfynol 485 | ethoxylated acetylenic diol | nonionic | 17 | Gelled 15 min 60° oven |

Example 4—Preparation of a Stable Waterborne Polymer Composition

Latex synthesis

The experimental setup was the same as in Example 1. The reactor was charged with 1100 g water, 9.2 g of sodium bicarbonate and heated to 80° C. A monomer mixture was made with 18 g of Aerosol TO-75 surfactant (a 75% solution of sodium di(2-ethylhexyl)sulfosuccinate in water-alcohol, a product of the Cytec Chemical Co.), 748 g of 2-ethylhexyl acrylate, 100 g of styrene, 187 g of methyl methacrylate, 55 g of acetoacetoxyethyl methacrylate, 1.4 g of trimethylolpropane triacrylate. To the reactor was added 44 g of the monomer mixture, followed by a solution of 6.0 g of sodium persulfate in 35 g of water. After 15 minutes, the remainder of the monomer mixture was fed to the reactor over a 3 hour period. At the same time a solution of 3.4 g of sodium persulfate, 3 g of sodium dodecylbenzene sulfonate and 112 g of water was added to the reactor over the same 3 hour period. The reaction mixture was held at 80° C. for 30 minutes after addition was complete, and the reactor was then cooled. As the reactor was cooled, a solution of 1.5 g of t-butylhydroperoxide in 30 g of water was added rapidly through the monomer feed line, and a solution of 3 g of sodium metabisulfite and 80 g of water was added over 30 minutes. The latex product was 44.8% solids, 224 nm diameter in 0.01 M NaCl and Tg was −21° C.

Addition of PEI and pH Adjustment

To 150 g of the latex product was added 0.96 g of Tergitol 15-S-40 surfactant (70% active), followed by 8.4 g of a 40% solution of LUPASOL™ G-35 polyethylenimine (a 50% solids product of BASF) in water. After 30 min, the pH of the mixture was adjusted to 9.8 with ammonium bicarbonate, as described in Example 1. The mixture was free of coagulum and was stable at 60° C. for two weeks.

Example 5—Comparative Example

To 150 g of the latex product of Example 4 was added 8.4 g of a 40% solution of LUPASOL™ G-35 polyethylenimine (a 50% solids product of BASF) in water, but without the addition of Tergitol 15-S-40 surfactant. The mixture partly coagulated as soon as the PEI was added.

Example 6: Preparation of a Stable Waterborne Polymer Composition

Latex Synthesis

A reactor was charged with 358 g of water, 11 g of Maphos 60A surfactant (acid form, 100% active, commercially available from Mazer Chemicals, Inc., Gurnee, Ill.) and 5.1 g of 50% sodium hydroxide solution and heated to 80° C. An emulsion was made from 361 g water, 3.3 g of Maphos 60A surfactant, 1.5 g of 50% sodium hydroxide solution, 26.1 g of Tergitol 15-S-40 surfactant (70% active, commercially available from Union Carbide), 31 g of 2-hydroxyethyl methacrylate, 178 g of styrene, 18.4 g of methyl methacrylate, 321 g of butyl acrylate, 49.2 g of acetoacetoxyethyl methacrylate and 36.9 g of sodium 2-acrylamido-2-methylpropane sulfonate (50% solution in water). To the reactor was charged 27 g of this emulsion, followed by a mixture of 1 g of sodium persulfate in 7 g of water. After 10 minutes, the remainder of the monomer emulsion was fed to the reactor over a two hour period. After 30 minutes, a solution of 1 g of sodium persulfate in 41 g of water was added over 95 minutes. The reactor was held at 80° C. for 30 minutes. A mixture of 0.75 g of t-butyl hydroperoxide (70% active) in 13 g of water was then added over 40 minutes. A mixture of 1 g of sodium metabisulfite, 1.5 g of 50% sodium hydroxide solution and 20 g of water was added concurrently as a separate stream.

The latex was cooled to 30° C. and treated with 0.6 g of Proxel BD20 biocide available from Zeneca Biocides, followed by 200g of LUPASOL™ G-35 polyethylenimine (40% active; polyethylene imine in water, commercially available from BASF Corporation) and 130 g of 17% ammonium bicarbonate solution. The product was a stable waterborne polymer composition having a solids content of 40% and a glass transition temperature (Tg) of 7.5° C.

Example 7: Preparation of a Non-Acetoacetoxy-Functional Polymer

Into a 2-liter, 3-necked, glass reactor equipped with an agitator, a reflux condenser and a nitrogen inlet was charged a solution consisting of 256.7 g de-ionized water, 2.0g of surfactant (a 45% solution of Dowfax 2A1, sodium dodecyl diphenyloxide disulfonate available from Dow Chemical), 2.7 g of sodium persulfate, and 3.6 g of sodium bicarbonate. An aqueous solution was prepared containing 1.3g of sodium persulfate in 17.6 g of de-ionized water. A monomer pre-emulsion was prepared containing 571.3 g of de-ionized water, 29.8g of surfactant (a 45% solution of Dowfax 2A1), 670.7 g of 2-ethylhexyl acrylate, and 223.6 g of ethyl acrylate.

The reactor charge was heated to 82° C. under a nitrogen atmosphere, and 4% of the pre-emulsion was charged to the reactor. After 10 minutes, the aqueous and pre-emulsion mixtures were pumped into the reactor over a four-hour period. After completion of the feeds, the reactor was held at 82° C. for one hour, then cooled to room temperature. The product was a latex polymer having a pH of 7.2, a solids content of 50.2%, a particle size of 149 nm, and a glass transition temperature (Tg) of −49.2° C.

Two hundred gram portions of the above latex were formulated with 1.5 parts (100% active) Triton X-405 which has an HLB 17.9, as a 70% solution from Union Carbide) CAS # 9002-93-1, NaOH to adjust the latex to pH 7, and 0.4 parts Alcogum 1228 thickener, which is an ammonium acrylate copolymer from ALCO Chemical Corporation.

Adhesive Applications and Test Methods
Determination of Shear Strength

Shear strength is determined in accordance with ASTM D3654-78, PSTC-7 and is a measure of the cohesiveness (internal strength) of an adhesive. ("PSTC" designates the Pressure Sensitive Tape Council). It is based on the time required for a static loaded tape sample to separate from a standard flat surface in a direction essentially parallel to the surface to which it has been affixed with a standard pressure. Each test is conducted on an adhesive coated strip applied to a standard stainless steel panel in a manner such that a one-half inch by one-half inch portion of the strip is in firm contact with the panel with one end portion of the strip being free. The steel panel, with coated strip attached, is held in a rack such that the panel forms an angle of 178° to 180° with the extended tape free end which is then tensioned by application of a force of 500 grams applied as a hanging weight from the free end of the test strip. The elapsed time required for each test strip to separate from the test panel is recorded as shear strength.

Determination of Rolling Ball Tack

Rolling ball tack is determined in accordance with PSTC-6 and is a measure of the capacity of an adhesive to form a bond with the surface of another material upon brief contact under virtually no pressure. The Rolling Ball Tack test is a method of quantifying the ability of an adhesive to adhere quickly to another surface. In the test, specimens are cut into 1"×18" lengths. Each specimen is placed onto a rolling ball apparatus (available from Chemsultants International) with adhesive side up. A steel ball (7/16 inch diameter) is rolled at a 45 angle onto the adhesive side up specimen. The distance from the point where the ball initially contacts the adhesive to where it stops is measured in inches. The reported values are an average of 5 tests.

Example 8: Preparation of a Pressure Sensitive Adhesive Composition

Part A: Control

With stirring, a mass of 0.6g of Tergitol 15-S-40 was added to a mass of 53g of the polymer composition of Example 7. The sample (A in Table 2 below) was mixed for 1 hour. The pH of the mixture was 6.4.

Part B:

With stirring, a mass of 10.0 g of Part A was added to a mass of 2 g of the stable waterborne polymer composition of Example 6. The resulting sample (B in Table 2 below) was mixed overnight. Using a K-Coat automatic applicator equipped with a #5 RK Rod and operating at a speed setting of 2.5, both samples (A and B) were applied to oriented polypropylene film (100 LBW from Mobil). The film was washed with acetone just prior to application. The samples were air-dried overnight. The shear strength and rolling ball tack were measured using the methods discussed above, with the results shown in Table 2.

TABLE 2

Ratio of the Weight of the Polymer Compositions of Examples 6 and 7, Shear Strength, and Rolling Ball Tack

| Sample | Ratio Composition Ex. 7: Composition Ex. 6 | Shear Strength Minutes | Rolling Ball Tack inches |
|---|---|---|---|
| Part A Control | 1:0 | 2.5 | 2.2 |
| Part B | 5:1 | 333.0 | 3.1 |

The results demonstrate that a blend of a stable waterborne polymer composition of the present invention with a non-acetoacetoxy functional polymer demonstrates greatly improved shear strength while maintaining good rolling ball tack over the non-acetoacetoxy-functional polymer alone.

Example 9: Preparation of a Laminating Adhesive Composition

Part A: Control

With stirring, a mass of 0.6g of Tergitol 15-S-40 was added to a mass of 53 g of the polymer of Example 7. The sample (A in Table 3 below) was mixed for 1 hour. The pH of the mixture was 6.4.

Part B

With stirring, a mass of 7.2 g of Part A was added to a mass of 2.86 g of the stable waterborne polymer composition of Example 6. The resulting sample (B in Table 3 below) was mixed overnight. Using a K-Coat automatic applicator equipped with a #5 RK Rod and operating at a speed setting of 2.5, both samples (A and B) were applied to oriented polypropylene film (100 LBW from Mobil). The film was washed with acetone just prior to application. The samples were air-dried overnight. The shear strength was measured using the method discussed above. The lamination or bond strength was measured as follows: A piece of unwashed oriented polypropylene film was placed on top of each sample. Each sample was rolled with a hand roller (HR-100 4.5 lb. from Chemsultants International). The films were placed in a forced air oven at 100 degrees Centigrade for 5 minutes. The samples were aged overnight. The bond strength of each was determined using an Instron Tensile Tester, Model TM, (Drive BX, Low BY=2) using a 5 lb. cell. The results are shown in Table 3.

TABLE 3

Ratio of the Weight of the Polymer Compositions of Examples 6 and 7, Shear Strength, and Bond Strength

| Sample | Ratio Composition Ex. 7: Composition Ex. 6 | Shear Strength Minutes | Bond Strength g/inch |
|---|---|---|---|
| Part A Control | 1:0 | 2.5 | 398 |
| Part B | 2.5:1 | >1282 | 525 |

The results demonstrate that a blend of a stable waterborne polymer composition of the present invention with a non-acetoacetoxy functional polymer demonstrates greatly improved shear strength and lamination bond strength over the non-acetoacetoxy-functional polymer alone.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. An adhesive composition comprising a mixture of
    (a) a stable waterborne polymer composition having a Tg of greater than about 0° C. and comprising (i) an acetoacetoxy-functional polymer not stabilized by a surfactant, (ii) a poly(alkylenimine), and (iii) a nonionic surfactant having a hydrophilic-lipophilic balance (HLB) of at least about 17.5, and
    (b) a non-acetoacetoxy functional polymer having a Tg of about 20° C. or lower, wherein the adhesive composition is essentially free of organic solvent.

2. The adhesive composition of claim 1, the non-acetoacetoxy-functional polymer (b) has a Tg of about −20° C. to about 20° C.

3. The adhesive composition of claim 1, wherein the non-acetoacetoxy-functional polymer (b) has a Tg of less than about 0° C.

4. The adhesive composition of claim 3, wherein the non-acetoacetoxy-functional polymer (b) has a Tg of less than about −20° C.

5. The adhesive composition of claim 1, comprising from about 2% to about 50% of the stable waterborne polymer composition (a) based on the combined weight of the stable waterborne polymer composition (a) and the non-acetoacetoxy functional polymer (b).

6. The adhesive composition of claim 1, wherein the acetoacetoxy-functional polymer of waterborne polymer composition (a) comprises the reaction product of about 0.5 to about 30 weight percent of vinyl monomers having acetoacetoxy functionality and about 99.5 to about 70 weight percent of other vinyl monomers.

7. The adhesive composition of claim 6, wherein the vinyl monomers having acetoacetoxy functionality is a vinyl monomer having an acetoacetoxy functionality of Formula (I):

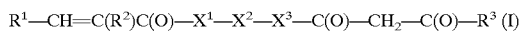

where $R_1$ is a hydrogen or halogen; $R^2$ is a hydrogen, halogen, $C_1$–$C_6$ alkylthio group, or $C_1$–$C_6$ alkyl group; $R^3$ is a $C_1$–$C_6$ alkyl group; $X^1$ and $X^3$ are independently O, S, or a group of the formula —N(R')—, in which R' is a $C_1$–$C_6$ alkyl group; and $X^2$ is a $C_1$–$C_{12}$ alkylene group or $C_3$–$C12$ cycloalkylene group.

8. The adhesive composition of claim 7, wherein the vinyl monomer having acetoacetoxy functionality is selected from the group consisting of acetoacetoxyethyl methacrylate, acetoacetoxyethyl acrylate, acetoacetoxy(methyl)ethyl acrylate, acetoacetoxypropyl acrylate, allyl acetoacetate, acetoacetamidoethyl (meth)acrylate, and acetoacetoxybutyl acrylate.

9. The adhesive composition of claim 1, wherein the poly(alkylenimine) comprises polyethylenimine.

10. The adhesive composition of claim 1, wherein the non-acetoacetoxy functional polymer (b) is selected from the group consisting of polyester-amides, alkyds, polyurethanes, polyamides, acrylics, vinyl polymers, polymers having pendant allyl groups, styrene-butadiene polymers, vinylacetate-ethylene copolymers, and mixtures thereof.

11. The adhesive composition of claim 10, wherein the non-acetoacetoxy functional polymer is an acrylic or a vinyl acrylic polymer.

12. A method for laminating a first substrate to a second substrate comprising applying an adhesive composition to a surface of the first substrate and pressing the surface of the first substrate against the second substrate, wherein the adhesive composition comprises a mixture of (a) a stable waterborne polymer composition having a Tg of greater than about 0° C. and comprising an acetoacetoxy-functional polymer, a poly(alkylenimine), and a nonionic surfactant having a hydrophilic-lipophilic balance (HLB) of at least about 17.5 and (b) a non-acetoacetoxy functional polymer having a Tg of about 20° C. or lower.

13. The method of claim 12, wherein the first substrate and second substrate are selected from the group consisting of polypropylene, polyethylene, polyethylene terephthalate, and polyvinyl chloride.

14. A method for laminating a first substrate and a second substrate comprising passing the first and second substrates through a two roll nip having an opening and injecting an adhesive composition at the nip opening towards the first substrate and/or the second substrate, wherein the adhesive composition comprises a mixture of (a) a stable waterborne polymer composition having a Tg of greater than about 0° C. and comprising an acetoacetoxy-functional polymer, a poly(alkylenimine), and a nonionic surfactant having a hydrophilic-lipophilic balance (HLB) of at least about 17.5 and (b) a non-acetoacetoxy functional polymer having a Tg of about 20° C. or lower.

15. An improved method for laminating a first substrate to a second substrate comprising applying an adhesive composition to a surface of the first substrate and pressing the surface of the first substrate against the second substrate, the improvement wherein the adhesive composition comprises a mixture of (a) a stable waterborne polymer composition having a Tg of greater than about 0° C. and comprising an acetoacetoxy-functional polymer, a poly(alkylenimine), and a nonionic surfactant having a hydrophilic-lipophilic balance (HLB) of at least about 17.5 and (b) a non-acetoacetoxy functional polymer having a Tg of about 20° C. or lower.

16. A method of making a substrate bearing a coating of a pressure sensitive adhesive on at least one surface thereof comprising applying an adhesive composition to a surface of the substrate, wherein the adhesive composition comprises a mixture of (a) a stable waterborne polymer composition having a Tg of greater than about 0° C. and comprising an acetoacetoxy-functional polymer, a poly(alkylenimine), and a nonionic surfactant having a hydrophilic-lipophilic balance (HLB) of at least about 17.5 and (b) a non-acetoacetoxy functional polymer having a Tg of about 0° C. or lower.

17. The method of claim 16, wherein the substrate is selected from the group consisting of polypropylene, polyethylene, polyethylene terephthalate, and polyvinyl chloride.

18. An improved method of making a substrate bearing a coating of a pressure sensitive adhesive on at least one surface thereof comprising applying an adhesive composition to a surface of a substrate, the improvement wherein the adhesive composition comprises a mixture of (a) a stable waterborne polymer composition having a Tg of greater than about 0° C. and comprising an acetoacetoxy-functional polymer, a poly(alkylenimine), and a nonionic surfactant having a hydrophilic-lipophilic balance (HLB) of at least about 17.5 and (b) a non-acetoacetoxy functional polymer having a Tg of about 0° C. or lower.

19. A method for improving the shear and/or cohesion of an adhesive composition comprising adding to the adhesive composition an effective amount of a stable waterborne polymer composition having a Tg of greater than about 0° C. and comprising an acetoacetoxy-functional polymer, a poly(alkylenimine), and, a nonionic surfactant having a hydrophilic-lipophilic balance (HLB) of at least about 17.5.

* * * * *